United States Patent
Kim et al.

(10) Patent No.: US 10,720,634 B2
(45) Date of Patent: Jul. 21, 2020

(54) METHOD FOR PRODUCING POSITIVE ELECTRODE FOR SECONDARY BATTERY

(71) Applicant: LG Chem, Ltd., Seoul (KR)

(72) Inventors: Ji Hye Kim, Daejeon (KR); Wang Mo Jung, Daejeon (KR); Byung Chun Park, Daejeon (KR); Ji Hoon Ryu, Daejeon (KR); Jung Min Han, Daejeon (KR)

(73) Assignee: LG Chem, Ltd. (KR)

( * ) Notice: Subject to any disclaimer, the term of this patent is extended or adjusted under 35 U.S.C. 154(b) by 116 days.

(21) Appl. No.: 15/968,900

(22) Filed: May 2, 2018

(65) Prior Publication Data

US 2018/0323423 A1  Nov. 8, 2018

(30) Foreign Application Priority Data

May 2, 2017  (KR) .................. 10-2017-0056514

(51) Int. Cl.
| | |
|---|---|
| *H01M 10/052* | (2010.01) |
| *H01M 4/04* | (2006.01) |
| *H01M 4/62* | (2006.01) |
| *H01M 4/66* | (2006.01) |
| *H01M 4/525* | (2010.01) |
| *H01M 10/0525* | (2010.01) |
| *H01M 4/1391* | (2010.01) |
| *H01M 4/131* | (2010.01) |
| *H01M 4/505* | (2010.01) |
| *H01M 4/02* | (2006.01) |

(52) U.S. Cl.
CPC ....... *H01M 4/0435* (2013.01); *H01M 4/0404* (2013.01); *H01M 4/131* (2013.01); *H01M 4/1391* (2013.01); *H01M 4/505* (2013.01); *H01M 4/525* (2013.01); *H01M 4/623* (2013.01); *H01M 4/625* (2013.01); *H01M 4/661* (2013.01); *H01M 10/0525* (2013.01); *H01M 2004/021* (2013.01); *H01M 2004/028* (2013.01); *H01M 2220/30* (2013.01)

(58) Field of Classification Search
CPC .................. H01M 10/052; H01M 10/0525
See application file for complete search history.

(56) References Cited

U.S. PATENT DOCUMENTS

| | | | |
|---|---|---|---|
| 2014/0356696 A1* | 12/2014 | Lee ............... | H01M 4/485 429/163 |
| 2016/0233504 A1* | 8/2016 | Itaya ............. | H01G 11/08 |
| 2018/0212249 A1 | 7/2018 | Lee et al. | |

FOREIGN PATENT DOCUMENTS

| | | |
|---|---|---|
| KR | 100975875 B1 | 8/2010 |
| KR | 10-2017-0023596 A | 3/2017 |
| KR | 10-2017-0034570 A | 3/2017 |
| WO | WO2015068680 * | 5/2015 |

* cited by examiner

Primary Examiner — Olatunji A Godo
(74) Attorney, Agent, or Firm — Lerner, David, Littenberg, Krumholz & Mentlik, LLP

(57) ABSTRACT

The present disclosure relates to a method for producing a positive electrode for a secondary battery, the method including applying a composition for forming a positive electrode on a positive electrode current collector to form a positive electrode mixture layer, and rolling the positive electrode mixture layer such that the elongation of the positive electrode current collector is less than 1%, to produce a positive electrode.

10 Claims, 2 Drawing Sheets

METHOD FOR PRODUCING POSITIVE ELECTRODE FOR SECONDARY BATTERY

CROSS-REFERENCE TO RELATED APPLICATIONS

This application claims the priority to Korean Patent Application No. 10-2017-0056514 filed on May 2, 2017, the disclosure of which is incorporated herein by reference.

TECHNICAL FIELD

The present disclosure relates to a method for producing a positive electrode for a secondary battery.

RELATED ART

Recently, with the rapid spread of electronic apparatuses using batteries, such as mobile phones, notebook computers, electrical vehicles, etc., demand for secondary batteries that are small, light-weight and relatively high-capacity has been rapidly increasing. Particularly, the lithium secondary battery is light-weight and has a high energy density, and thus attracts attention as a driving power source of portable devices.

Accordingly, research and development efforts are actively performed for improving the performance of the lithium secondary battery. In a state in which an organic electrolyte or a polymer electrolyte is filled between a positive electrode and a negative electrode composed of an active material capable of intercalation and deintercalation of lithium ions, the lithium secondary battery produces electrical energy by oxidation and reduction reactions when the lithium ions are intercalated and deintercalated in the positive electrode and the negative electrode.

In order to use the secondary battery in various uses, efforts are underway to produce the secondary battery having various performances such as a high capacity, a high output, a long service life, a high-speed charging, and the like. Among them, it is important to consider how much active material may be filled up to produce a high capacity battery.

However, when excessive rolling is performed in order to produce a high capacity battery by increasing the packing density of the battery, disconnection of an electrode occurs or crack formation of the active material increases, and thus capacity characteristics and high-temperature life characteristics may be deteriorated and the generation of gas may be increased.

Thus, it is necessary to develop a method in which an active material and a current collector are not damaged while increasing the packing density of the battery.

SUMMARY

An aspect of the present disclosure provides a method for producing a positive electrode for a secondary battery, wherein the method may not damage an active material and a current collector while increasing the packing density of an electrode through a rolling process, thus realizing high-capacity, excellent high-temperature life characteristics, and high-temperature storage characteristics.

Another aspect of the present disclosure provides a method for producing a positive electrode for a secondary battery, the method including: applying a composition for forming a positive electrode on a positive electrode current collector to form a positive electrode mixture layer; and rolling the positive electrode mixture layer such that the elongation of the positive electrode current collector is less than 1% to form a positive electrode.

In particular, the rolling may be performed two times or less at a pressure of 3 to 5 kgf. After the rolling, the porosity of the positive electrode mixture layer may become 25% or less. In addition, the positive electrode current collector before the rolling may have an area of 1.4875 cm$^2$ and a weight per 20 μm thickness of 8.0 to 9.0 mg.

The composition for forming a positive electrode may include a positive active material, a conductive material and a binder, and the positive electrode active material may have an average particle diameter ($D_{50}$) of 5 to 15 μm. Further, the positive electrode active material may include large-diameter particles having an average particle diameter ($D_{50}$) of 15 to 25 μm and small-diameter particles having an average particle diameter ($D_{50}$) of 3 to 6 μm. The large-diameter particles and the small-diameter particles may be mixed at a weight ratio of 9:1 to 7:3.

In addition, the positive electrode current collector may be nickel, titanium, sintered carbon, or stainless steel, and the positive electrode active material may be a lithium transition metal oxide, nickel (Ni), cobalt (Co), or manganese (Mn).

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Figure 1:
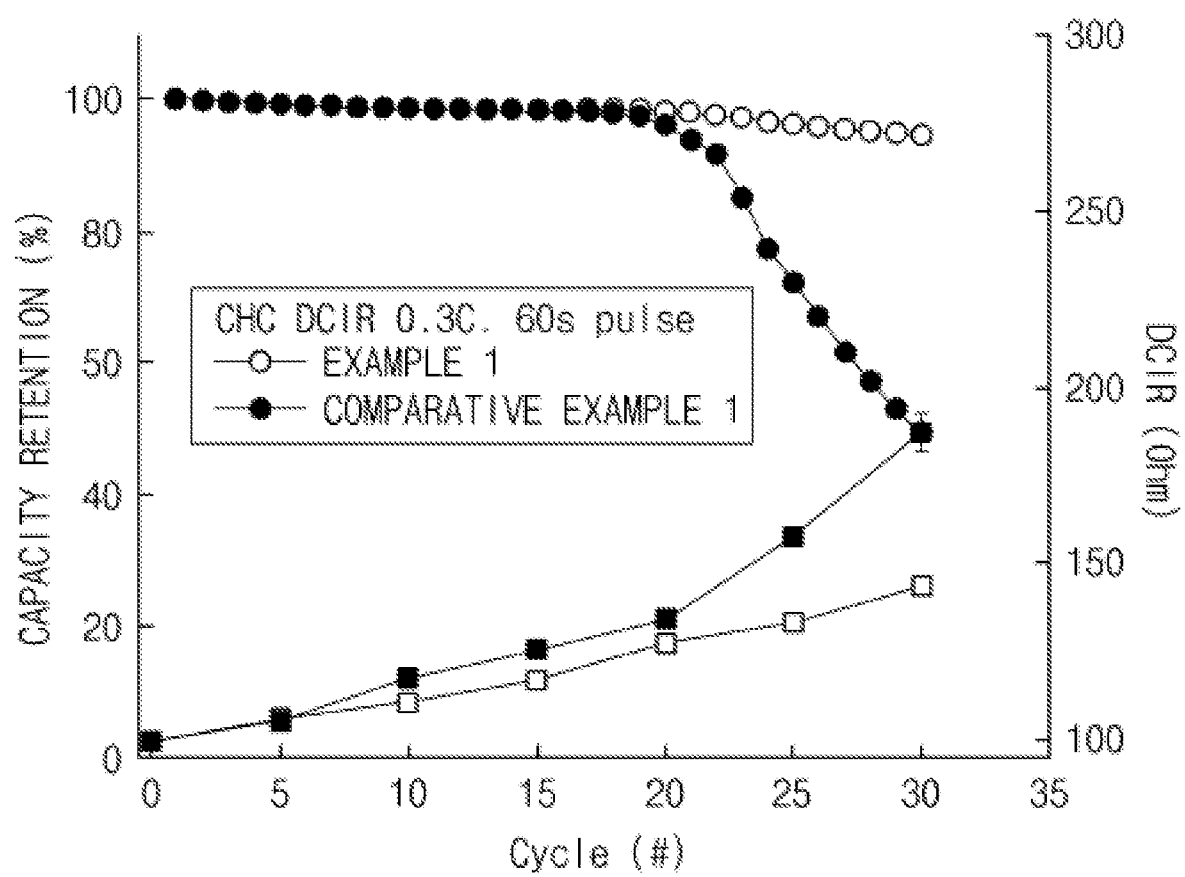
FIG. 1 is a graph illustrating capacity retentions and DC resistance changes depending on charge/discharge cycles of battery cells produced by using positive electrodes according to Example 1 and Comparative Example 1.

Advantages and features of the present disclosure and methods of achieving the same will become apparent with reference to the exemplary embodiments described in detail below in conjunction with the accompanying drawings. However, the present disclosure is not limited to the exemplary embodiments disclosed below, but may be provided in various different forms. The present exemplary embodiments are merely provided to make the disclosure complete and to fully inform the category of the disclosure to a person having ordinary knowledge in the technical field to which the present disclosure pertains, and the present disclosure is only defined by the scope of the claims.

Accordingly, in some embodiments, well-known process steps, well-known structures and well-known techniques will not be specifically described in order to avoid ambiguous interpretation of the present disclosure. The terms used in the present specification are for the purpose of illustrating the examples and do not limit the present disclosure. As used herein, the singular form also includes the plural forms unless specifically stated in a phrase. The terms "comprises" and/or "comprising" used in the specification are used in the meaning of not excluding the presence or addition of one or more other constituent elements, steps, operations and/or elements, in addition to the referenced constituent elements, step, operation and/or element. Further, the term "and/or" includes each and one or more combinations of the referenced items.

Exemplary embodiments of the present disclosure will now be described in detail with reference to the accompanying drawings.

Hereinafter, the present disclosure will be described in more detail to allow for a clearer understanding of the present disclosure. In this case, it will be understood that terms or words used in the present specification and claims shall not be interpreted as the meaning defined in commonly used dictionaries. It will be further understood that the words or terms should be interpreted as having a meaning that is consistent with their meaning in the context of the relevant art and the technical idea of the disclosure, based on the principle that an inventor may properly define the meaning of the words or terms to best explain the disclosure.

A method for producing a positive electrode for a secondary battery includes: applying a composition for forming a positive electrode on a positive electrode current collector to form a positive electrode mixture layer; and rolling the positive electrode mixture layer such that the elongation of the positive electrode current collector is less than 1%, to produce a positive electrode.

In order to realize a positive electrode having a high energy density, it is important that a positive electrode active material has a high packing density. In order to increase the capacity density of an electrode, the composition for forming a positive electrode is applied on the current collector and rolled. In this case, when excessive rolling is performed for increasing the packing density, the positive electrode active material may be damaged, resulting in a decrease in capacity, and the elongation of the positive electrode current collector also increases, so that the electrode may be disconnected eventually. Accordingly, there is required a production method capable of increasing the packing density of the positive electrode active material and preventing damage of the positive electrode active material and disconnection of the electrode.

Therefore, in the present disclosure, by rolling the positive electrode current collector such that the elongation of the positive electrode current collector may become less than 1%, the packing density of the positive electrode active material may be increased to realize high energy density, and at the same time, disconnection of the electrode may be prevented and high-temperature life characteristics and the high-temperature storage characteristics may be improved.

The present disclosure will be described in more detail. First, a composition for forming a positive electrode may be applied on a positive electrode current collector to form a positive electrode mixture layer.

The positive electrode current collector is not particularly limited as long as it has conductivity without causing chemical changes to the electrode, and may include, for example, stainless steel, aluminum, nickel, nickel, titanium, sintered carbon, or a stainless steel or aluminum which is surface-treated with carbon, titanium, silver or the like. In addition, the positive electrode current collector may usually have a thickness of 3 to 500 μm, and fine unevenness may be formed on the surface of the current collector to increase the adhesion of the positive electrode active material. For example, the positive electrode current collector may be used in various forms, such as a film, a sheet, a foil, a net, a porous body, a foam, or a nonwoven fabric.

The positive electrode current collector may have an area of 1.4875 cm$^2$, a weight per 20 μm thickness of 8.0 to 9.0 mg, more preferably 8.1 to 8.5 mg, most preferably 8.1 to 8.15 mg.

The composition for forming a positive electrode may be prepared by dissolving or dispersing a positive electrode active material, a conductive material and a binder in a solvent.

The positive electrode active material may be a lithium transition metal oxide commonly used as a positive electrode active material, and more preferably, may be a lithium transition metal oxide including at least one selected from the group consisting of nickel (Ni), cobalt (Co) and manganese (Mn). For example, the positive electrode active material may be, but is not limited to, a layered compound, such as lithium cobalt oxide (liCoO$_2$) or lithium nickel oxide (LiNiO$_2$); a lithium manganese oxide, such as a lithium manganese oxide represented by the formula Li$_{1+x1}$Mn$_{2-x1}$O$_4$ (where x1 is 0 to 0.33), LiMnO$_3$, LiMn$_2$O$_3$, LiMnO$_2$ or the like; a Ni site-type lithium nickel oxide represented by formula LiNi$_{1-x2}$M$^1_{x2}$O$_2$ (where M$^1$=Co, Mn, Al, Cu, Fe, Mg, B or Ga, x2=0.01 to 0.3); a lithium manganese composite oxide represented by formula LiMn$_{2-x3}$M$^2_{x3}$O$_2$ (where M$^2$=Co, Ni, Fe, Cr, Zn or Ta, x3=0.01 to 0.1) or Li$_2$Mn$_3$M$^3$O$_8$ (where M$^3$=Fe, Co, Ni, Cu or Zn); a lithium manganese composite oxide having a spinel structure and represented by formula LiNi$_{x4}$Mn$_{2-x4}$O$_4$ (where x$^4$=0.01 to 1); or the like.

In addition, the positive electrode active material may include a lithium transition metal oxide represented by Formula 1 below.

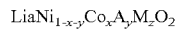    [Formula 1]

In Formula 1 above, A is at least one selected from the group consisting of Mn and Al, M is at least one element selected from the group consisting of Ba, Ca, Zr, Ti, Mg, Ta, Nb, Mo and Cr, and 1.0≤a≤1.5, 0≤x≤0.2, 0≤y≤0.2, 0≤z≤0.1, 0≤x+y≤0.7. More preferably, when the x+y is 0.2 or less, a high capacity of the battery may be realized. That is, the positive electrode active material may be a high-concentration nickel positive electrode active material having a Ni content of 80 mol % or more.

The positive electrode active material may be a positive electrode active material having a single average particle diameter (D$_{50}$). In order to further improve the packing density, two or more positive electrode active materials having different average particle diameters (D$_{50}$) may be mixed and used.

When the positive electrode active material having a single average particle diameter (D$_{50}$) is used (unimodal), the positive electrode active material may have an average particle diameter of 5 to 15 μm, more preferably 9 to 13 μm, most preferably 10 to 11 μm.

In addition, when two positive electrode active materials having different average particle diameters (D$_{50}$) are used, the positive electrode active materials may be used by mixing large-diameter particles having an average particle diameter (D$_{50}$) of 15 to 25 μm, more preferably 16 to 18 μm with small-diameter particles having an average particle diameter (D$_{50}$) of 3 to 6 μm, more preferably 4 to 5 μm. In this case, the large-diameter particles and the small-diameter particles may be mixed at a weight ratio of 9:1 to 7:3, more preferably 8:2. When the mixing weight ratio is satisfied, the packing density of the positive electrode active material may be further improved to realize a high capacity.

The conductive material is used for imparting conductivity to the electrode, and may be used without any particular limitation as long as it has electron conductivity without causing chemical changes. Specific examples of the conductive material may include graphite such as natural graphite and artificial graphite; carbon-based materials such as carbon clack, acetylene black, ketjen black, channel black, furnace black, lamp black, summer black and carbon fiber; metal powder or metal fibers such as copper, nickel, aluminum, and silver; conductive whisker such as zinc oxide and potassium titanate; a conductive metal oxide such as titanium oxide; or a conductive polymer such as a polyphenylene derivative, or the like, and one kind alone or a mixture of two or more kinds thereof may be used.

The binder plays a role in improving bonding between the positive electrode active material particles and adhesion between the positive electrode active material and the current collector. Specific examples of the binder may include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluorine rubber, or various copolymers thereof, and one kind alone or a mixture of two or more kinds thereof may be used.

The solvent may be any solvent commonly used in the art. The solvent may be dimethyl sulfoxide, (DMSO), isopropyl alcohol, N-methylpyrrolidone (NMP), acetone, water, or the like, and one kind alone or a mixture of two or more kinds thereof may be used. The amount of solvent will be sufficient so long as the solvent can dissolve or disperse the positive electrode active material, the conductive material and the binder in consideration of the thickness of slurry to be applied and the production yield, and then can have a viscosity capable of exhibiting excellent thickness uniformity when applied for producing the positive electrode.

The composition for forming the positive electrode may be applied and dried to form a positive electrode mixture layer. The drying may be performed for 5 to 120 minutes at 80 to 150° C., more preferably 90 to 130° C.

The positive electrode mixture layer thus formed may include a positive electrode active material in an amount of 80 to 99 wt %, more specifically 85 to 98 wt %, based on the total weight of the positive electrode mixture layer. When the positive electrode active material is included in the above amount range, excellent capacity characteristics may be exhibited.

In addition, the conductive material may be included in an amount of 1 to 30 wt %, based on the total weight of the positive electrode mixture layer. Also, the binder may be included in an amount of 1 to 30 wt %, based on the total weight of the positive electrode mixture layer.

Next, a positive electrode is produced by rolling the positive electrode mixture layer such that the elongation of the positive electrode current collector is less than 1%.

In the present disclosure, the elongation of the positive electrode current collector may be defined as the weight reduction ratio per 1.4875 $cm^2$ area and 20 μm thickness of the current collector after rolling compared to before rolling. For example, when the weight of current collector punched at the area of 1.4875 $cm^2$ and the thickness of 20 μm is 8.0 mg before rolling and then is reduced by 0.08 mg after rolling, the elongation of the current collector is 1%.

When the rolling is performed until the elongation of the positive electrode current collector reaches 1% or more, the electrode may be disconnected, and the positive electrode may be damaged or destroyed, resulting in an increase in crack formation, and the capacity reduction, deterioration of high-temperature life, and the generation of gas during high-temperature storage may be increased.

The porosity of the positive electrode mixture layer after the rolling may be 25% or less, more preferably 18 to 25%, most preferably 23 to 24%. When the porosity of the rolled positive electrode mixture layer exceeds 25%, the packing density of the positive electrode active material may be lowered, which makes it difficult to realize a high energy density. Therefore, in an embodiment of the present disclosure, the positive electrode current collector may be rolled such that the porosity of 25% or less is satisfied while the elongation of the positive electrode current collector satisfies a percentage of less than 1%.

The rolling is not particularly limited as long as it is performed by a typical electrode rolling apparatus capable of uniform rolling while realizing the porosity or the like, but a roll press may be used.

The rolling may be more preferably performed two times or less. When the rolling is repeated more than two times until the desired porosity is obtained, the elongation of the current collector may become large, and high-temperature life characteristics and storage characteristics may be deteriorated. In order to realize a high energy density, the porosity of the positive electrode mixture layer is required to be set to a certain level or less (for example, 25% or less). However, in order for the porosity to reach a certain level while reducing the number of rolling times to twice or less, rolling strength (e.g., force or pressure) is inevitably increased. However, in the case where rolling is performed more than twice at a relatively weak rolling strength and the case where rolling is performed twice or less at a relatively strong rolling strength, when comparing the cases when both the cases reach the same porosity, the weight reduction ratio of the current collector, that is, the elongation may be lower, by at most three times or greater in the case where rolling is performed twice or less at a relatively strong rolling strength than the case where rolling is performed more than twice.

Therefore, in an embodiment of the present disclosure, by performing rolling two times or less, the elongation of the current collector may be reduced, and the capacity characteristics, high-temperature life characteristics and high-temperature storage characteristics may be improved.

In this case, the rolling may be performed at a pressure of 3 to 5 kgf, more preferably 3.5 to 5 kgf, most preferably 4 to 5 kgf.

According to still another embodiment of the present disclosure, there is provided an electrochemical element including the positive electrode thus produced. The electrochemical element may be a battery, a capacitor, or the like, and more specifically, may be a lithium secondary battery.

Specifically, the lithium secondary battery includes a positive electrode, a negative electrode positioned opposite to the positive electrode, a separator interposed between the positive electrode and the negative electrode, and an electrolyte. The positive electrode is the same as described above. Also, the lithium secondary battery may optionally further include a battery container for receiving an electrode assembly of the positive electrode, the negative electrode and the separator, and a sealing member for sealing the battery container.

In the lithium secondary battery, the negative electrode includes a negative electrode current collector, and a negative electrode mixture layer positioned on the negative electrode current collector.

The negative electrode current collector is not particularly limited as long as it has high conductivity without causing chemical changes to the electrode. Examples of the negative electrode current collector may include copper, stainless steel, aluminum, nickel, titanium, sintered carbon, a copper or stainless steel which is surface-treated with carbon, nickel, silver, or the like, an aluminum-cadmium alloy, or the like. Further, the negative electrode current collector may typically have a thickness of 3 μm to 500 μm. Like the positive electrode current collector, fine unevenness may be formed on the surface of the current collector to enhance the bonding force of the negative electrode active material. For example, the negative electrode current collector may be used in various forms such as a film, a sheet, a foil, a net, a porous body, a foam, and a nonwoven fabric.

The negative electrode mixture layer optionally includes a binder and a conductive material together with a negative electrode active material.

As the negative electrode active material, a compound capable of reversible intercalation and deintercalation may be used. Specific examples of the negative electrode active material may include a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, Si alloy, Sn alloy, or Al alloy; metal oxides capable of doping and dedoping lithium, such as $SiO_\beta$ ($0<\beta<2$), $SnO_2$, vanadium oxide, and lithium vanadium oxide; a composite containing the metallic compound and the carbonaceous material, such as Si—C composite or Sn—C composite, and any one or a mixture of two or more thereof may be used. In addition, as the negative electrode active material, a metal lithium thin film may be used. Further, the carbonaceous material may be both low-crystalline carbon and highly-crystalline carbon. Soft carbon and hard carbon are typical low-crystalline carbon. Typical examples of the highly-crystalline carbon include amorphous, plate-like, flaky, spherical or fibrous natural graphite or artificial graphite, kish graphite, pyrolytic carbon, mesophase pitch based carbon fiber, meso-carbon microbeads, high-temperature sintered carbon such as mesophase pitches and petroleum or coal tar pitch derived cokes. More preferably, a Si-based negative electrode active material may be used for realizing a high capacity.

By using the positive electrode of the present disclosure filled with a sacrificial salt additive in the pore when the negative electrode containing a Si-based compound is used as a negative electrode active material, the initial efficiency of the positive electrode may be lowered, and the life characteristics thereof may be improved.

In addition, the binder and the conductive material may be the same as those described above in the production method of the positive electrode.

In one example, a composition for forming a negative electrode, which is produced by dissolving or dispersing a negative electrode active material and optionally a binder and a conductive material in a solvent, may be applied and dried on the negative electrode current collector, or the composition for forming a negative electrode may be casted on a separate support, and then a film obtained by being detached from the support may be laminated onto the negative electrode current collector, so that the negative electrode mixture layer may be produced.

On the other hand, in the lithium secondary battery, the separator separates the negative electrode and the positive electrode from each other, and provides a moving passage for lithium ions. The separator may be used without any particular limitation as long as it is used as a separator in a typical lithium secondary battery. Particularly, it is preferable that the separator has a low resistance against the ion migration of the electrolyte and has an excellent ability to impregnate the electrolyte. Specifically, the separator may be a porous polymer film, for example, a porous polymer film made of a polyolefin-based polymer such as an ethylene homopolymer, a propylene homopolymer, an ethylene/butene copolymer, an ethylene/hexene copolymer and an ethylene/methacrylate copolymer, or a laminated structure of two or more layers thereof. Further, a typical porous nonwoven fabric, for example, a nonwoven fabric made of a glass fiber having a high melting point, a polyethylene terephthalate fiber or the like may be used. In addition, in order to secure heat resistance or mechanical strength, a coated separator containing a ceramic ingredient or a polymer material may be used, and may be optionally used as a single layer or multilayer structure.

In addition, examples of the electrolyte used in the present disclosure may include, but are not limited to, an organic liquid electrolyte, an inorganic liquid electrolyte, a solid polymer electrolyte, a gel-type polymer electrolyte, a solid inorganic electrolyte, a melt-type inorganic electrolyte, or the like, which may be used in the production of the lithium secondary battery.

Specifically, the electrolyte may include an organic solvent and a lithium salt.

The organic solvent may be used without any particular limitation as long as it serves as a medium through which ions involved in the electrochemical reaction of the battery may migrate. Specific examples of the organic solvent may include an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methylethylcarbonate (MEC), ethylmethyl carbonate (EMC), ethylene carbonate (EC), or propylene carbonate (PC); an alcohol-based solvent such as ethyl alcohol or isopropyl alcohol; nitriles such as R-CN (wherein R is a linear, branched or cyclic hydrocarbon group having 2 to 20 carbon atoms and may include a double bond aromatic ring or ether bond); amides such as dimethylformamide; dioxolanes such as 1,3-dioxolane; sulfolanes; or the like. The carbonate-based solvent thereof is preferable, and a mixture of a cyclic carbonate (for example, ethylene carbonate, propylene carbonate, or the like) having a high ionic conductivity and a high dielectric constant capable of increasing the charge/discharge performance of the battery, and a linear carbonate-based compound (for example, ethylmethyl carbonate, dimethyl carbonate, diethyl carbonate, or the like) having a low viscosity is more preferable. In this case, when the cyclic carbonate and the chain carbonate are mixed in a volume ratio of about 1:1 to about 1:9, the performance of the electrolyte may be excellent.

The lithium salt may be used without any particular limitation as long as it is a compound capable of providing lithium ions used in the lithium secondary battery. Examples of the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$. The concentration of the lithium salt may be used in the range of 0.1 to 2.0 M. When the concentration of the lithium salt is included in the above range, the electrolyte has an appropriate conductivity and viscosity, so that the performance of the electrolyte may be excellent and the lithium ions may effectively migrate.

In order to improve the life characteristics of the battery, suppress the decrease of the battery capacity, improve the discharging capacity of the battery, etc., in addition to the above electrolyte ingredients, the electrolyte may further include at least one additive such as a haloalkylene carbonate-based compound such as difluoroethylene carbonate; pyridine; triethylphosphite; triethanolamine; cyclic ether; ethylene diamine; n-glyme; hexaphosphoric triamide; nitrobenzene derivatives; sulfur; quinone imine dyes; N-substituted oxazolidinones; N,N-substituted imidazolidine; ethylene glycol dialkyl ether; ammonium salt; pyrrole; 2-methoxy ethanol; or aluminum trichloride. In this case, the additive may be included in an amount of 0.1 to 5 wt %, based on the total weight of the electrolyte.

As described above, since the lithium secondary battery including the positive electrode active material according to the present disclosure stably exhibits excellent discharge capacity, output characteristics, and capacity retention, the lithium secondary battery may be useful for a portable device such as a mobile phone, a notebook computer or a digital camera, an electric vehicle such as a hybrid electric vehicle (HEV), and the like.

Thus, according to another embodiment of the present disclosure, there is provided a battery module including the lithium secondary battery as a unit cell, and a battery pack including the same.

The battery module or the battery pack may be used as a power tool; electric vehicles including an electric vehicle (EV), a hybrid electric vehicle, and a plug-in hybrid electric vehicle (PHEV); or a power source for any one or more medium- or large-sized devices among power storage systems.

The external shape of the lithium secondary battery of the present disclosure has no particular limitation, but may be a cylindrical shape, a square shape, a pouch shape, a coin shape, or the like, which uses a can.

The lithium secondary battery according to the present disclosure may be preferably used not only as a battery cell used as a power source of a small device but also as a unit cell in a medium- or large-sized battery module including a plurality of battery cells.

Hereinafter, examples of the present disclosure will be described in detail so that those skilled in the art may carry out the present disclosure. The present disclosure may, however, be embodied in many different forms, and should not be construed as limited to the examples set forth herein.

Example 1

Li(Ni$_{0.86}$Co$_{0.1}$Mn$_{0.02}$Al$_{0.02}$)O$_2$ having an average particle diameter of 10 μm as a positive electrode active material, carbon black, and a PVDF binder were mixed at a weight ratio of 96.5:1.5:2.0 in a N-methylpyrrolidone solvent to produce a composition for forming a positive electrode, and the composition was applied on one surface of an aluminum current collector (8.1 mg, 1.4875 cm$^2$, thickness 20 μm) and dried at 130° C. to form a positive electrode mixture layer. Thereafter, a positive electrode was produced by being rolled once at 4 kgf using a roll press.

Example 2

A positive electrode was produced in the same manner as in Example 1, except for being rolled once at 3 kgf using a roll press.

Example 3

A positive electrode was produced in the same manner as in Example 1, except that a large-diameter particle having an average particle diameter (D$_{50}$) of 18 μm and a small-diameter particle having an average particle diameter (D$_{50}$) of 4 μm were mixed at a weight ratio of 8:2 and used as a positive electrode active material.

Example 4

A positive electrode was produced in the same manner as in Example 2, except that a large-diameter particle having an average particle diameter (D$_{50}$) of 18 μm and a small-diameter particle having an average particle diameter (D$_{50}$) of 4 μm were mixed at a weight ratio of 7:3 and used as a positive electrode active material.

Comparative Example 1

A positive electrode was produced in the same manner as in Example 1, except for being rolled 3 times at 3 kgf by using a roll press.

Comparative Example 2

A positive electrode was produced in the same manner as in Example 1, except for being rolled 5 times at 2 kgf by using a roll press.

Comparative Example 3

A positive electrode was produced in the same manner as in Example 1, except for being rolled 7 times at 1 kgf by using a roll press.

Comparative Example 4

A positive electrode was produced in the same manner as in Example 1, except for being rolled 9 times at 0.5 kgf by using a roll press.

Comparative Example 5

A positive electrode was produced in the same manner as in Example 1, except for being rolled once at 6 kgf by using a roll press.

Comparative Example 6

A positive electrode was produced in the same manner as in Example 1, except for being rolled once at 8 kgf by using a roll press.

Comparative Example 7

A positive electrode was produced in the same manner as in Example 1, except for being rolled once at 7 kgf by using a roll press.

Experimental Example 1: Evaluation of Electrode Density, Porosity, and Elongation of Current Collector The electrode density, porosity, and current collector elongation of the positive electrode produced in Examples 1 to 4 and Comparative Examples 1 to 7 were measured, and the results were shown in Table 1 by evaluating whether the electrode was disconnected.

A weight of the positive electrode mixture layer was firstly calculated by subtracting the weight of the positive electrode current collector from the total weight of the positive electrode, and the weight of the positive electrode mixture layer previously calculated was divided by the value obtained by multiplying a punching area of 1.4875 cm² with the thickness of the positive electrode mixture layer excluding the thickness of the positive electrode current collector, so that the electrode density was calculated.

The value obtained by subtracting the density of the previously obtained positive electrode mixture layer from the true density of the positive electrode active material was divided by the true density again, so that the porosity was calculated.

The elongation of the current collector was evaluated by a reduction ratio of the weight per unit of the current collector after rolling, with respect to the weight per unit thereof before rolling.

In addition, SEM images was used for observing whether an Al current collector was disconnected depending on the elongation.

rolling process as in Example 1 as compared to the case of being rolled repeatedly exceeding 2 times as in Comparative Example 4, the elongation is remarkably reduced.

Experimental Example 2: Evaluation of High-Temperature Life Characteristics and High-Temperature Storage Characteristics A secondary battery cell was produced by using the positive electrode produced by Example 1 and Comparative Example 1.

Specifically, natural graphite as a negative electrode active material, a carbon black conductive material, and a PVDF binder were mixed in a N-methylpyrrolidone solvent at a weight ratio of 85:10:5 to produce a composition for forming a negative electrode, and the composition was applied onto one surface of a copper current collector to produce a negative electrode.

A separator containing porous polyethylene was interposed between the positive electrode and the negative elec-

TABLE 1

| | Rolling times (times) | Electrode density (g/cc) | Porosity (%) | Elongation (weight reduction ratio of current collector) (%) | Whether the electrode is disconnected |
|---|---|---|---|---|---|
| Example 1 | 1 | 3.55 | 21.0 | 0.86 | X |
| Example 2 | 1 | 3.39 | 24.5 | 0.49 | X |
| Example 3 | 1 | 3.55 | 20.9 | 0.37 | X |
| Example 4 | 1 | 3.42 | 24 | 0.01 | X |
| Comparative Example 1 | 3 | 3.42 | 24 | 1.1 | ○ |
| Comparative Example 2 | 5 | 3.49 | 22.3 | 1.6 | ○ |
| Comparative Example 3 | 7 | 3.53 | 21.6 | 2.7 | ○ |
| Comparative Example 4 | 9 | 3.56 | 20.7 | 3.3 | ○ |
| Comparative Example 5 | 1 | 3.63 | 19.2 | 1.98 | ○ |
| Comparative Example 6 | 1 | 3.69 | 17.9 | 2.22 | ○ |
| Comparative Example 7 | 1 | 3.79 | 15.6 | 1.35 | ○ |

Referring to Table 1, in the case of Examples 1 to 4 in which the current collector was rolled until reaching an elongation of less than 1%, the electrode was not disconnected, and in Comparative Examples 1 to 7 exceeding the limit rolling, the electrode was disconnected.

On the other hand, in the case of Examples 3 and 4 which uses two positive electrode active materials having different average particle diameters ($D_{50}$) (bimodal) as compared to Examples 1 and 2 using a positive electrode active material having a single average particle diameter ($D_{50}$) (unimodal), it may be seen that the elongation at a similar level of porosity is significantly reduced. That is, in the case of using two positive electrode active materials having different average particle diameters ($D_{50}$) as compared to the case of using a positive electrode active material having a single average particle diameter ($D_{50}$) (unimodal), due to the excellent packing properties, the porosity at the same elongation the porosity may be further reduced and the capacity density may be improved.

Meanwhile, in Example 1 and Comparative Example 4, although the porosities did not significantly differ, the elongation in Comparative Example 4 was increased by about 3 times. That is, it may be seen that in the case of being rolled 2 times or less with relatively strong rolling intensity in the trode produced as described above to produce an electrode assembly. The electrode assembly is positioned inside a case, and then an electrolyte was introduced into the case to produce a lithium secondary battery. In this case, the electrolyte was prepared by dissolving lithium hexafluorophosphate ($LiPF_6$) having a concentration of 1.0 M in an organic solvent composed of ethylene carbonate (EC)/dimethyl carbonate (DMC)/ethyl methyl carbonate (EMC) (mixed volume ratio of EC/DMC/EMC=3/4/3).

A capacity retention [%] and a resistance increase rate [%] (DCIR [%]) were measured while charging and discharging the lithium secondary battery produced as described above for 30 cycles at 45° C. under the conditions of a charging end voltage of 4.25 V, a discharging end voltage of 2.5 V, and 0.3 C/0.3 C. The measurement results are shown in Table 2 below and FIG. 1.

Figure 2:
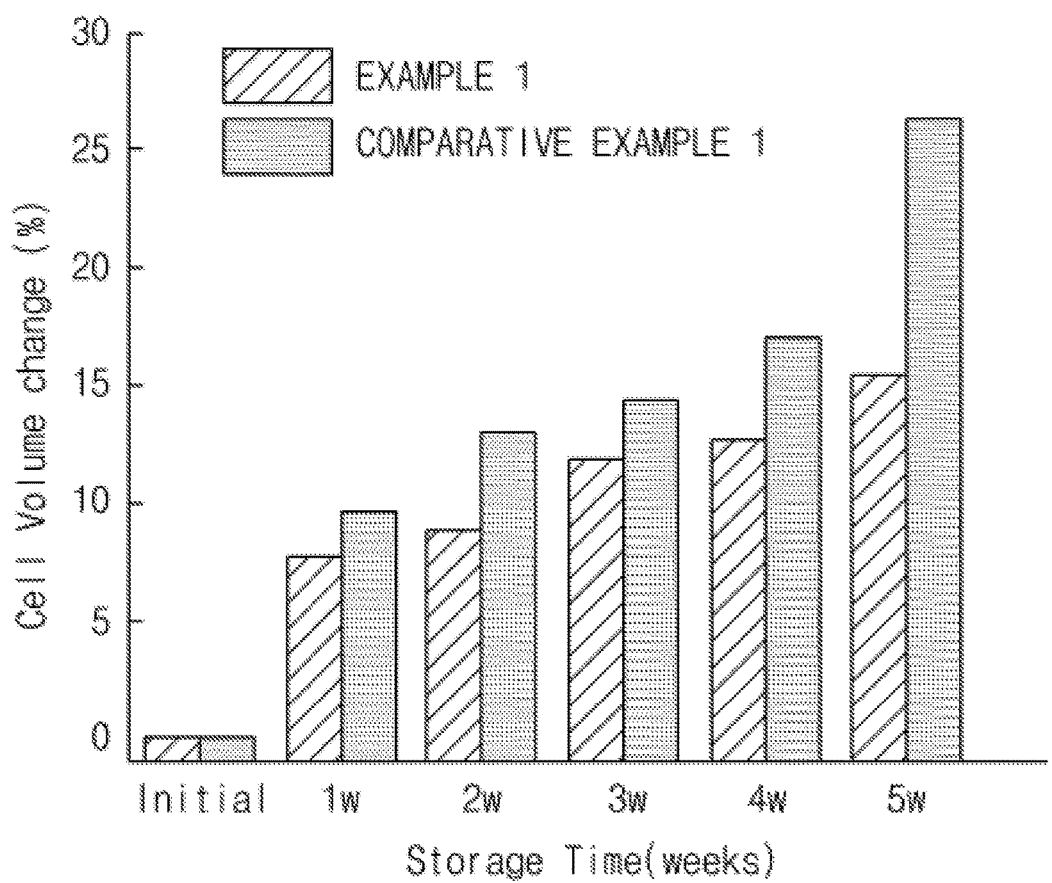
FIG. 2 is a graph illustrating cell volume changes depending on high-temperature storage periods of battery cells manufactured by using positive electrodes according to Example 1 and Comparative Example 1.

In addition, a cell volume change was measured while storing the lithium secondary battery for 5 weeks at 60° C. When the battery was stored at a high temperature, the generation of gas was increased. The more the generation of gas was, the more the cell volume change was, so that it may be evaluated that high-temperature storage characteristics was deteriorated. The measurement results are shown in Table 2 below and FIG. 2.

TABLE 2

|  |  | Example 1 | Comparative Example 1 |
|---|---|---|---|
| DCIR (Ohm) | $1^{st}$ | 14.8 | 15.4 |
|  | $30^{th}$ | 21.26 | 28.82 |
|  | ΔDCIR (%) | 43.6 | 87.2 |
| Capacity retention (@cycle30) (%) |  | 94.8 | 49.6 |

Referring to Table 2 and FIG. 1, it may be seen that in Example 1 in which the current collector was rolled until reaching an elongation of less than 1%, a DCIR resistance increase rate is lower and a capacity retention is higher than Comparative Example 1 exceeding the limit rolling, so that high-temperature life characteristics is improved.

TABLE 3

|  | Example 1 | | Comparative Example 1 | |
|---|---|---|---|---|
| Storage period | Cell volume change (%) | STDEV (3set) | Cell volume change (%) | STDEV (3set) |
| Initial | 0 | 0.0317 | 0 | 0.1148 |
| 1 w | 7.7 | 0.0542 | 9.7 | 0.1426 |
| 2 w | 8.9 | 0.1442 | 13.0 | 0.0152 |
| 3 w | 11.9 | 0.1345 | 14.4 | 0.0602 |
| 4 w | 12.7 | 0.0197 | 17.1 | 0.1318 |
| 5 w | 15.4 | 0.0071 | 26.3 | 0.1768 |

(*STDEV: volume change standard deviation of 3set cell)

Referring to Table 3 and FIG. 3, it may be seen that in Example 1 in which the current collector was rolled until reaching an elongation of less than 1%, the cell volume change is smaller than Comparative Example 1 exceeding the rolling limit, thus the generation of gas being small and high-temperature life characteristics being improved.

According to aspects of the present disclosure, a positive electrode of a secondary battery, which may prevent the active material and the current collector from being damaged and destroyed due to rolling while increasing sufficiently the packing density of the electrode, thereby having high energy density, high capacity, excellent high-temperature life characteristics and high-temperature storage characteristics, may be produced.

While the present disclosure has been shown and described in connection with the exemplary embodiments, it will be apparent to those skilled in the art that modifications and variations can be made without departing from the spirit and scope of the disclosure as defined by the appended claims.

What is claimed is:

1. A method for producing a positive electrode for a secondary battery, the method comprising:
    applying a composition for forming the positive electrode on a positive electrode current collector to form a positive electrode mixture layer; and
    rolling the positive electrode mixture layer such that the elongation of the positive electrode current collector is less than 1%, to produce the positive electrode,
    wherein the elongation is a weight reduction ratio per 1.4875 cm$^2$ area and 20 μm thickness of the current collector after rolling compared to before rolling.

2. The method of claim 1, wherein the rolling is performed two times or less.

3. The method of claim 1, wherein after the rolling, the porosity of the positive electrode mixture layer is 25% or less.

4. The method of claim 1, wherein the rolling is performed at a pressure of 3 to 5 kgf.

5. The method of claim 1, wherein the positive electrode current collector before the rolling has an area of 1.4875 cm$^2$ and a weight per 20 μm thickness of 8.0 to 9.0 mg.

6. The method of claim 1, wherein the composition for forming a positive electrode comprises a positive active material, a conductive material, and a binder,
    wherein the positive electrode active material has an average particle diameter ($D_{50}$) of 5 to 15 μm.

7. The method of claim 1, wherein the composition for forming the positive electrode comprises a positive active material, a conductive material, and a binder,
    wherein the positive electrode active material comprises large-diameter particles having an average particle diameter ($D_{50}$) of 15 to 25 μm and small-diameter particles having an average particle diameter ($D_{50}$) of 3 to 6 μm.

8. The method of claim 7, wherein the large-diameter particles and the small-diameter particles are mixed at a weight ratio of 9:1 to 7:3.

9. The method of claim 1, wherein the positive electrode current collector is at least one selected from the group consisting of nickel, titanium, sintered carbon, and stainless steel.

10. The method of claim 1, wherein the composition for forming the positive electrode comprises a positive electrode active material, a conductive material and a binder,
    wherein the positive electrode active material is a lithium transition metal oxide comprising at least one selected from the group consisting of nickel (Ni), cobalt (Co), and manganese (Mn).

* * * * *